F. G. DIETERICH.
RICE HULLING MACHINE.
APPLICATION FILED APR. 17, 1908.
912,449.
Patented Feb. 16, 1909.
4 SHEETS—SHEET 3.
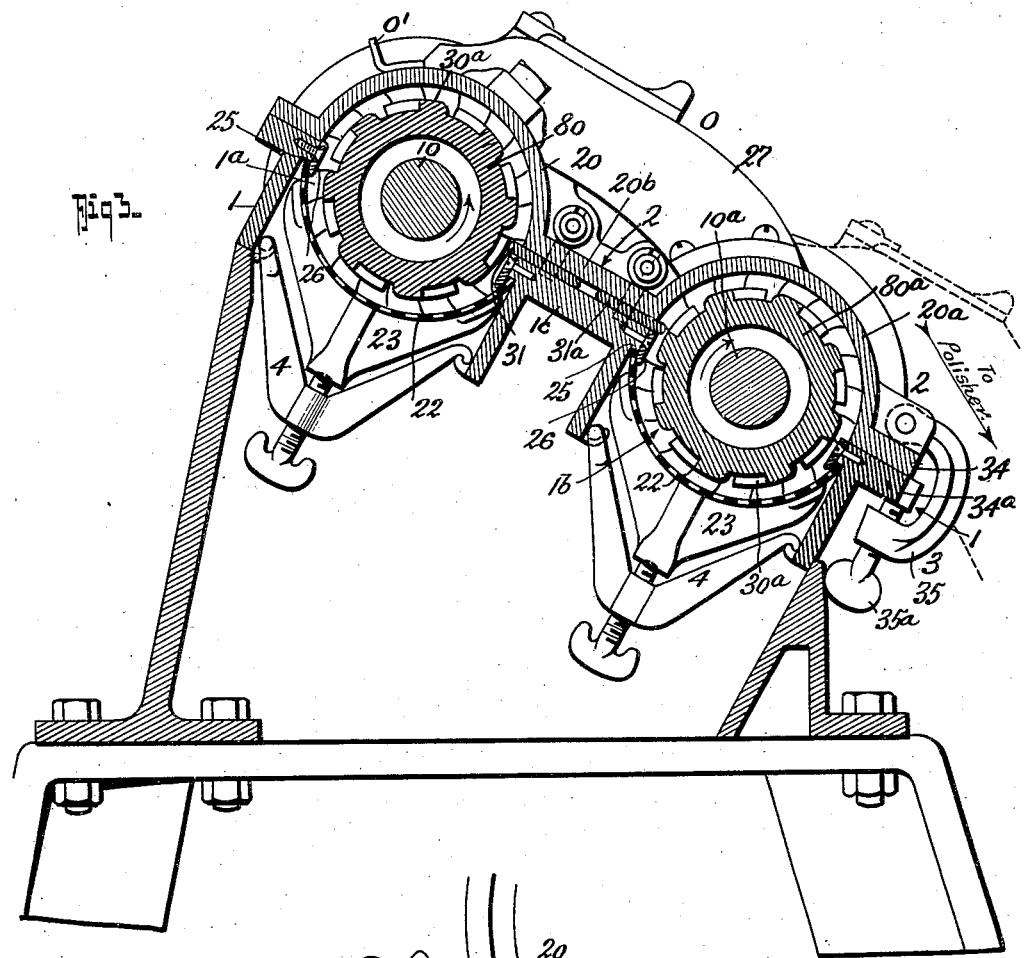
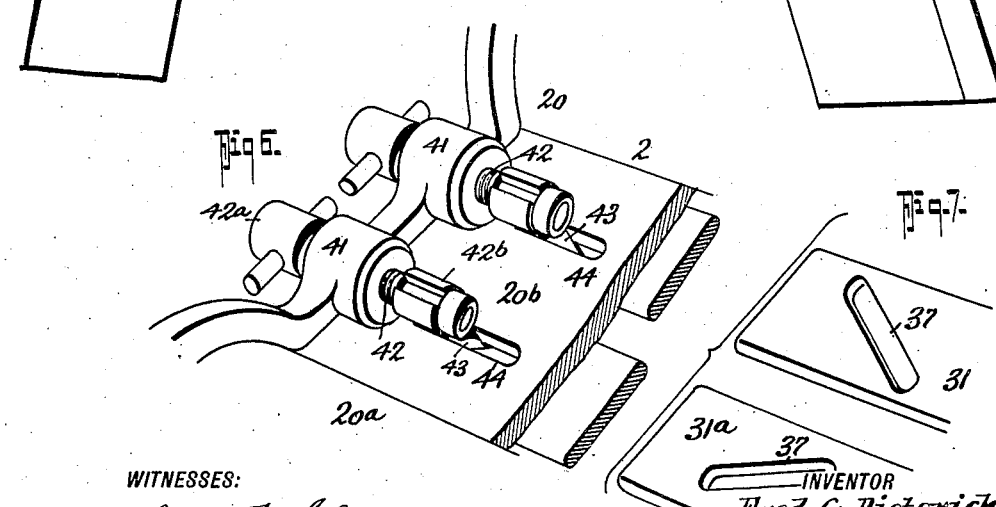
WITNESSES:
John T. Schrott
Charles H. Wagner
INVENTOR
Fred G. Dieterich
BY
Fred G. Dieterich & Co.
ATTORNEYS.

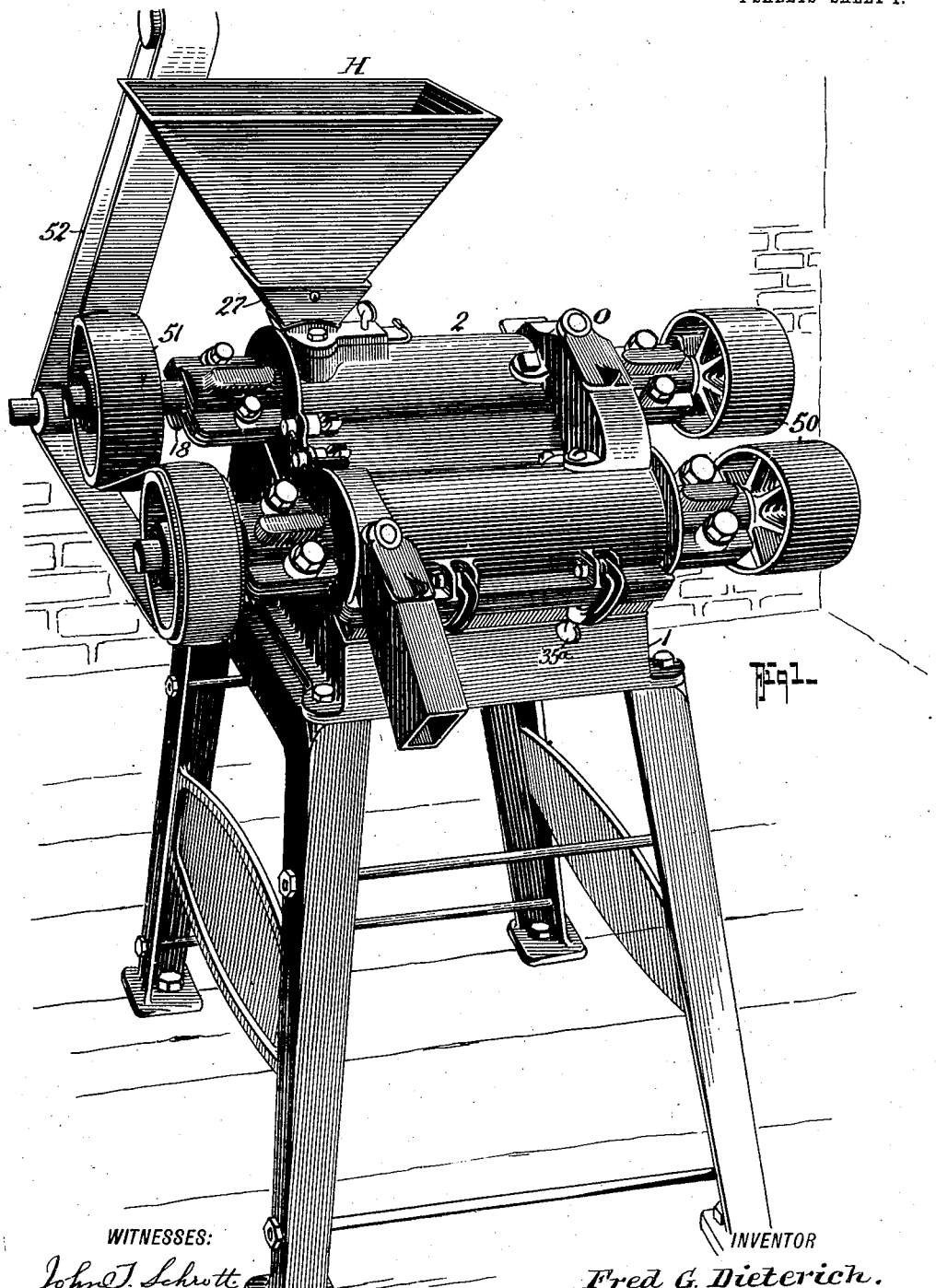

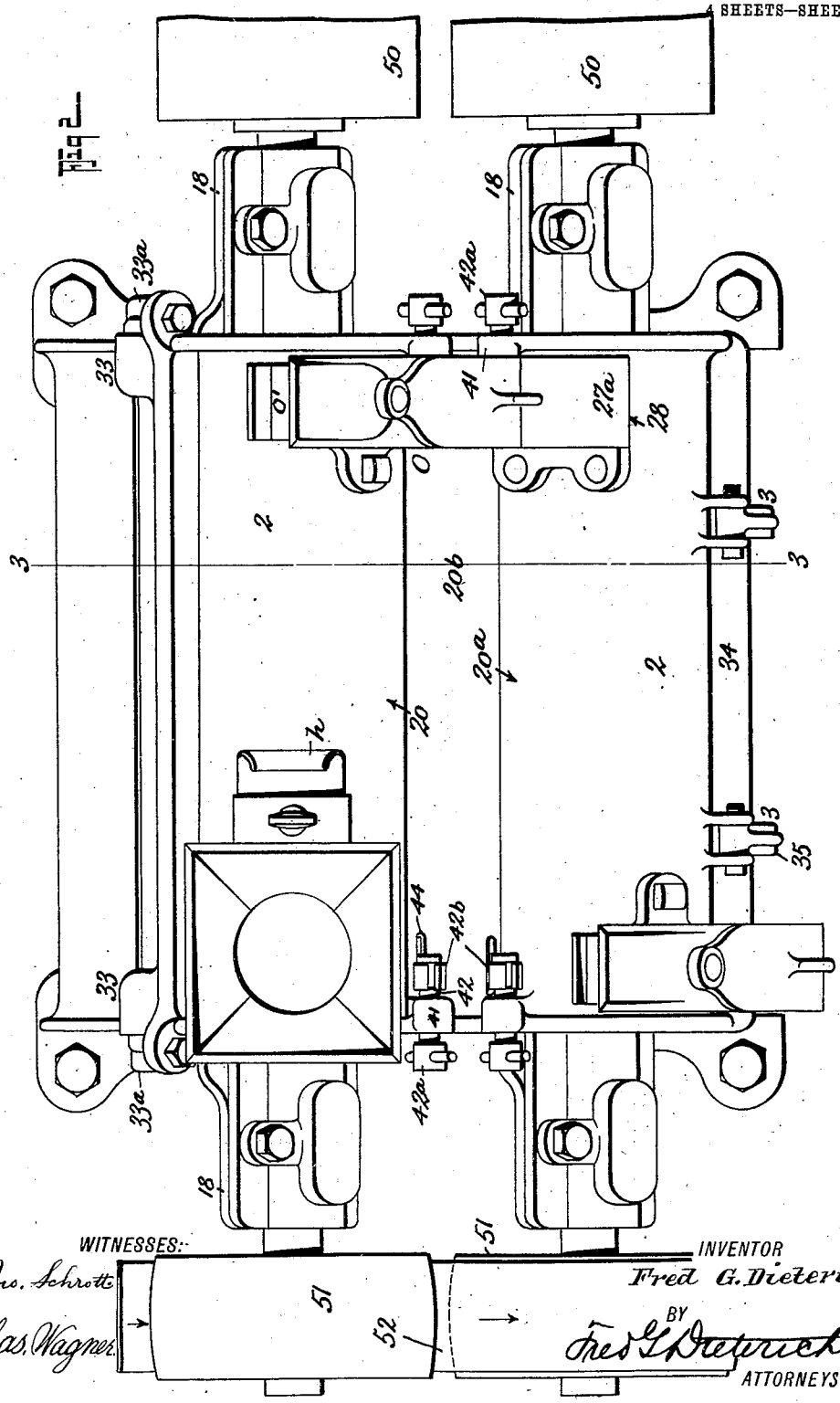

F. G. DIETERICH.
RICE HULLING MACHINE.
APPLICATION FILED APR. 17, 1908.
912,449.
Patented Feb. 16, 1909.
4 SHEETS—SHEET 4.
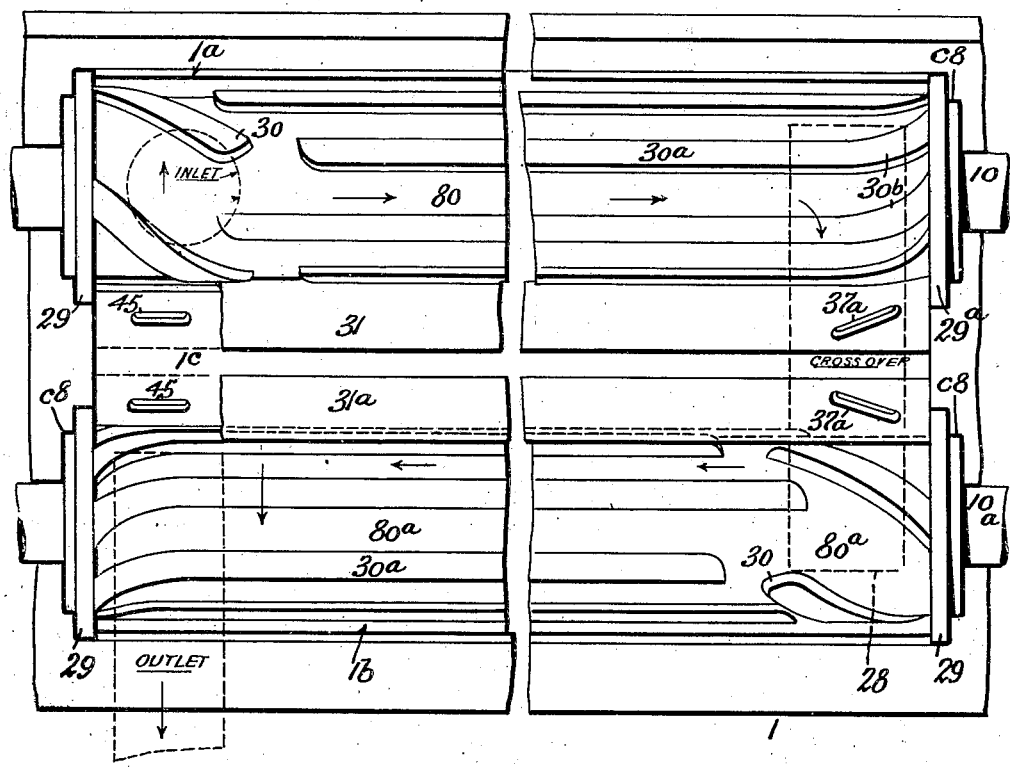
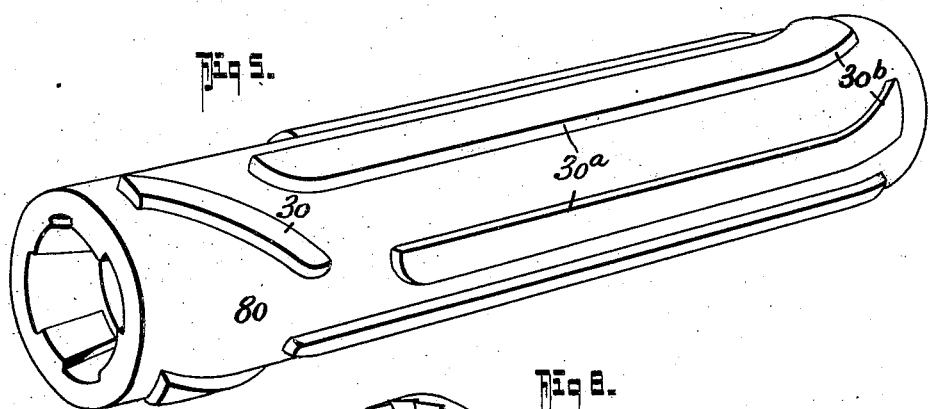
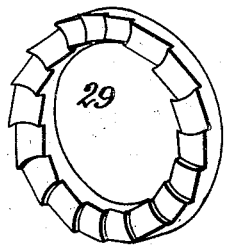
WITNESSES:
John T. Schrott
Charles H. Wagner.
INVENTOR
Fred G. Dieterich.
BY
Fred G. Dieterich & Co
ATTORNEYS.

UNITED STATES PATENT OFFICE.

FRED G. DIETERICH, OF WASHINGTON, DISTRICT OF COLUMBIA.

RICE-HULLING MACHINE.

No. 912,449.          Specification of Letters Patent.          Patented Feb. 16, 1909.

Application filed April 17, 1908. Serial No. 427,727.

*To all whom it may concern:*

Be it known that I, FRED G. DIETERICH, residing in the city of Washington, District of Columbia, have invented a new and Improved Rice-Hulling Machine, of which the following is a specification.

My present invention generally seeks to provide certain improvements in machines for removing the hulls, cuticle and gummy coatings from rice, coffee and other grains or berries, and it more particularly relates to that type of machine, disclosed in my Patent No. 770,226, patented September 13, 1904 and in my co-pending application filed Feb. 13, 1905, No. 245456, which generally comprehend an externally ribbed cylinder for coöperating with an opposing abrading surface or huller blade, projected into the casing in which the cylinder is mounted, and which has a feed inlet at one end and a discharge at the other end.

In constructing rice mills for large capacity, it is usual to provide a series of hullers of the type referred to, six or eight being generally used, through which the rice is consecutively fed, so as to receive the desired preliminary separations of the bean from the hulls and cuticle and the good beans from the imperfect, smooth and broken beans, before the hulled and scoured product passes off to the final polishing and grading means. From practical experiment, I have found that in transferring the partially scoured or hulled rice grains through the series of hullers, which is usually done by connecting a long wooden spout to the discharge of one huller and the inlet end of the next huller, that the grains become chilled to such an extent, that as they pass into the next huller, a considerable energy of the said next huller must be exerted to bring the partially hulled and scoured grains up to that degree of heat that they had prior to discharging from the first or preceding huller and in a condition most desirable, since the best results of hullers of the kind referred to is obtained after the rice grain bulk contained therein has been thoroughly heated by abrasion, such condition being practically necessary to admit of removing the cuticle and effecting a partial scouring, the obtaining of the desired hulling and scouring results in the larger mills being obtained only by passing the rice through a number of hullers, and it should be stated that in the smaller or plantation mills where but a single huller is used, the rice must be passed through the huller a number of times, the huller blade being adjusted to effect the desired separations and preliminary scouring.

Another and serious objection in the use of hullers of the type stated is the expense incident in the equipment of six or eight and sometimes more in a single mill, since each huller must be separately mounted, belted and adjusted.

Primarily, my present invention seeks to provide an improved construction of rice hulling or scouring means in which the cost of equipment of a mill is materially reduced, and in which during the action of a plurality of ribbed cylinders and coacting hulling blades the grain is maintained at its desired heated condition while passing from one hulling cylinder to another.

My present invention, in its generic nature, therefore comprehends the combining of a plurality, preferably two ribbed cylinders and coöperating abrading surfaces, within a single casing, providing as it were, a single machine in which the rice receives a continuous, and two distinct, but successive hulling and scouring operations, and in which the parts are operated from a single drive belt.

Again, my present invention embodies a "twin cylinder" hulling machine, in which the rice is fed into the casing at one end thereof, subjected to the action of one hulling cylinder as it passes forward and under the action of another hulling cylinder as it passes backward to a discharge located at the inlet end of the casing, independently adjustable hulling blades being coöperatively combined with the two cylinders.

In its more specific nature, this invention consists in certain details of construction and combination of parts, all of which will be hereinafter fully explained, pointed out in the appended claims and illustrated in the accompanying drawings, in which:

Figure 1, is a perspective view of my invention showing the same arranged as a "twin cylinder" rice hulling machine. Fig. 2, is a plan view of my improved construction of huller. Fig. 3, is a transverse section of the machine shown in Fig. 1, taken substantially on the line 3—3 on Fig. 2. Fig. 4, is a plan view of the lower part of the huller casing with the two coöperating cylinders and the hulling blades, the direction of movement of the rice through the complete machine being indicated by arrows. Fig. 5, is a detail perspective view of one of the hulling cylinders. Fig. 6, is a detail perspective view of the adjusting and locking devices that coöperate with the hulling blades. Fig. 7, is a detail view of one end of the pair of huller blades. Fig. 8, is a view of one of the cylinder collars hereinafter specified.

While my present invention is more particularly intended for use in rice mills and in describing the same I shall point out its advantages as more especially applicable in hulling rice grains, I desire it understood that without changing the generic features the same can be readily utilized for hulling, cleaning and separating coffee hulls, as will hereinafter more fully appear.

Referring now more particularly to Figs. 1, 2 and 3, the casing comprises a lower section 1 and an upper section 2, the latter being hinged to the lower section to swing back the same as shown in my patent before mentioned, the front edges of the two casing sections having flat flanges, with which the hinged yoke clamps 3 and clamp screws 35$^a$ coact, as shown in the drawings. In the present arrangement of the two part casing the lower section is formed with two longitudinal compartments 1$^a$—1$^b$, each of which constitutes a hulling casing, the opposite ends of each of which has the semi-circular sockets $c^8$ and the axially extended half bearings 18 for ends of the shafts 10—10$^a$ of the two hulling cylinders 80—80$^a$, the general construction of which, with respect to their ribbed faces, may be like that shown in my co-pending application and as shown in Figs. 4 and 5. The upper casing section in the present construction has two semi-cylindrical portions 20—20$^a$ that oppose the lower casing portions 1$^a$—1$^b$ and midway the portions 20—20$^a$ the casing 2 has a flat clamping portion 20$^b$ that opposes a flat bearing portion 1$^c$ of the lower casing member which forms the bearing for the huller blades. In my present construction, the two hulling casings and cylinders are disposed in different horizontal planes, the first casing and cylinder, which I shall hereinafter term the receiving casing and cylinder being uppermost, the reason for which will presently appear. Each of the hulling casings includes a screen bottom 22 of the usual semi-circular shape, detachably held to its operative position by saddle or yoke irons 23 and the bridge members 4, constructed and detachably mounted on the bed frame the same as shown in my other application referred to and clearly understood from Fig. 3 of the present drawings, from which it will be seen the ends of the screen bottoms engage the shoulder like bearings 25—25 of the bed frame, to which they are held by the steel clamp plates 26—26. The upper or receiving huller casing has the usual infeed opening at one end, provided with a choking gate $h$, the hopper H being mounted over the said opening as shown. The opposite end of the upper casing has the usual outlet O, also provided with a choking gate or valve $o'$, which discharges into a metal duct 27, formed as an integral part of the upper casing casting. This duct extends transversely of the machine, is downwardly inclined and discharges through an inlet 28, formed in the adjacent or infeed end of the other hulling casing, it being understood that in practice the feed to the upper hulling casing is regulated to suit the adjustments provided for regulating the capacity of the lower discharging hulling cylinder and casing.

At this point it should be stated in practice the grain becomes very hot by reason of its constant rubbing against the hulling means and the cylinder, the metal parts likewise becoming heated, and by reason thereof the feed duct 27, which is an integral part of the casing is likewise heated and thus prevents the primary or first process hulled and scoured grains from chilling or becoming appreciably cooled in passing from the upper to the lower hulling means, such handling of the material being treated, greatly increasing the capacity of the machine, since little or no energy of the second or lower hulling means is necessary to restore the primarily hulled and scoured grain to its desired heated condition for further effective hulling and scouring, as is necessary in the common methods now employed, since the necessity of passing the grain through long wooden spouts or ducts from one hulling machine to another is overcome and the danger of chilling the hulled product as it passes from one process cylinder to the other is avoided, since by reason of the short spout that connects the discharge of one cylinder casing with the inlet of the other cylinder casing is of metal and constantly kept hot, the grain as it passes into the second cylinder and casing is substantially in condition to be acted on with the same results of scouring that it received in the discharge end of the other cylinder.

The hulling cylinders 80—80$^a$, one of which is shown in detail in Fig. 5, each are of a length slightly in excess of the length of the cylinder casings, as clearly shown in Fig. 4, whereby the said ends project into the circular seats or pockets 28—28 in the casing ends, and the ribs of the said cylinders stop short of the ends thereof, whereby to allow for the reception of the end collars 29—29$^a$ that are slipped onto the smooth ends of the cylinders and are made fast therein so they turn with the cylinders. The cylinder ribs comprise the infeed end ones 30, that begin at the collar at the said end and extend diagonally and transversely forwardly whereby to direct the infed grain quickly forward and in a spiral direction along the casing so as to impart the proper start or forward movement to the grain. The infeed ribs that extend along but a short distance of the length of the cylinder project between the ends of a pair of the long longitudinally and parallelly disposed ribs 30$^a$ with which coact the similar but shorter longitudinal ribs, the said long ribs forming, as it were, the main hulling ribs, since from the infeed end to the discharge end of the said ribs the rice bulk travels slowly forwardly as it is being rapidly carried around over the internal face of the casing and brought into contact with the hulling blades, presently again referred to. The ends of the long ribs 30$^a$ turn upwardly to form the scoop or lifts 30$^b$ of the cylinder for carrying the grain at the corresponding head of the casing toward the discharging outlet O, the said lifts ending against the collar 29$^a$, the said collar, as also the collar 29 at the other end positively preventing any of the grains crowding between the ends of the cylinders and the casing heads.

Co-acting with each cylinder is a hulling blade 31—31$^a$, and these blades, as is best shown in Figs. 3 and 4, are mounted on the flat bearing portion 1$^c$ of the lower half of the duplex casing casting or frame that forms, as it were, the bridge between the two lower half section cylinder compartments and which oppose the like formed flat bridge or clamping portion 20$^b$ of the upper casing section that securely holds the flat blades 31—31$^a$ to their horizontal planes with respect to the axes of the hulling cylinders. By arranging the hulling blades in the manner shown, they can be readily projected into their respective casings so as to coact with the cylinder ribs on the up going side of the cylinders and further, two blades will be adjacently so disposed that the adjusting means therefor and presently again referred to, can be conveniently manipulated.

The upper casing member 2 is hinged at the upper or rear edge at the opposite ends, see 33, to the ears 33$^a$ of the lower casing section, as clearly shown in Fig. 2 and the front ends of the upper and lower casing section have flat opposing bearing flanges 34—34$^a$ that extend the full length of the casing, and with which the U-shaped yoke clamps coact, said clamps each comprising a yoke shaped member 35, hinged at the upper end to the upper front flange 34 and having a set screw 35$^*$ for engaging the other or lower flange 34$^a$, as clearly shown in Fig. 3, the said clamping devices being arranged substantially the same as the similar devices in my patent and co-pending application before referred to. For conveniently adjusting the huller blades as well as providing them with sufficient bearing to withstand the back pressure thereon during the operation of hulling and also for interchangeably adjusting the same to bring the opposite edges thereof into position for coacting with the hulling cylinders, I arrange the plate as shown in Fig. 7, by reference to which it will be seen that the opposite ends of the huller blades have diagonally disposed elongated slots 37—37$^a$ and these slots are so inclined with respect to the blades and to each other, that the said blades may be readily reversed, or changed from end to end to acquire the maximum use of the abrading surfaces thereof.

The ends or heads of the casing frame have each a pair of inwardly projected bosses 41 in each of which is mounted an adjusting screw 42 that carries a handle wheel, 42$^a$, at the outer end, and has a saddle piece 42$^b$ mounted on the inner end that has a stout pendent lug 43. The saddles, with the lugs are adjusted in opposite directions in the longitudinal plane of the machine by properly adjusting the screws 42—42, and thus if the said screws are turned inwardly or home, the saddles 42$^b$ are likewise moved inwardly and when the screws are turned in the other direction the saddle members 42$^b$ are moved longitudinally outwardly, thus providing as it were, for the reciprocable movement of the studs 43. Near the threaded bosses 41, the flat or clamping part 20$^a$ of the upper casing section has two longitudinally extended parallel slots 44 through which the pendent lugs project and the opposing flat portion 1$^c$ of the lower casing casting has longitudinal recesses or grooves 45 in the upper face that register with the slots 44, and onto which the lower ends of the lugs 43 project.

By providing the recesses 45 disposed in the longitudinal plane that is parallel with the slots in the upper casing portion, the pendent lugs 43 form stout bearings for taking up back lash or strain on the huller blade and thereby relieve the threaded bolts and saddles from a torsional twist or strain and provide for a solid back bearing for the blades, each of which has a diagonal slot 37—37$^a$ in the opposite ends through which pass the lower end of the screw lugs 43, it being manifest that as the slots in the huller blade ends are diagonally disposed with respect to the slots in the upper and lower casing members, it follows the huller blades will be moved transversely inwardly or outwardly by simply manipulating the screw bolts and in such manner that one huller blade, the lower one, for example, may be adjusted up closer to its co-acting cylinder than the other, whereby a more perfect hulling of the primarily hulled or scoured rice that passes from the upper huller casing is effected. Again, the huller blades may be readily set on a slight angle with respect to their hulling cylinders by shifting the screw at one end, more than the screw at the other end.

Each cylinder shaft carries a fly wheel 50, and a belt pulley 51, and about the two belt wheels is passed a single drive belt 52 that takes around the pulleys 51 in such manner that they turn toward each other, it being further manifest that by arranging the blades and the cylinders and the casings as described, the lower or inner cylinder may be provided with a belt wheel of slightly less diameter than the belt wheel of the other cylinder and since both cylinders are driven by the single endless belt, the cylinders will be caused to revolve away from each other and at different speeds.

It will be noticed that in the present construction of my improved rice huller, a double acting or twin cylinder huller is provided in which the casing mount can be provided at but a slight cost over the cost of manufacture of the single cylinder huller disclosed in my co-pending application, heretofore specified.

By disposing the two cylinders in different horizontal planes with the receiving one the highest, it follows that a positive discharge of the partially scoured or hulled material from the upper to the lower cylinder is effected and which may be also greatly facilitated by having the lower cylinder revolve at a higher speed than the upper cylinder.

From the foregoing description, taken in connection with the accompanying drawings, the complete construction and the advantages of my invention will be readily understood.

While I have described my present invention as especially adapted for removing the hulls and otherwise cleaning the rice grains, I know that the same with but slight immaterial modification of the parts, can be adapted for hulling larger grains such as coffee, and furthermore, while for commercial use the "twin cylinder" form of my invention as shown and described is a preferred construction, it is manifest that a greater number of cylinders and compartments on a single casing mount may be provided for without departing from my present invention or the scope of the appended claims.

Having thus described my invention, what I claim is:—

1. A hulling machine comprising a bed portion formed with a plurality of longitudinal parallel compartments, each having a screened bottom, the said compartments being disposed in an inclined plane, a hulling cylinder mounted in each compartment, means for imparting reverse rotary motion to each adjacent pair of cylinders, a single casing section that fits over the bed portion and is provided with longitudinal compartments, one in each of the compartments in the bed portion for receiving the upper portions of the cylinders, huller blades for co-acting with the several cylinders held between the bed portion and the top casing section, the said top casing section having means for joining the discharge end of one hulling compartment with the receiving end of the adjacent compartment, and having a feed inlet for the first or uppermost hulling compartment and a discharge for the last or lowermost compartment.

2. In combination, a two part casing having a pair of horizontally disposed longitudinal parallel compartments, one in a plane below the other and each having an inlet at one end and a discharge at the other end, an inclosed by-pass that connects the outlet of one compartment with the inlet of the other compartment and independently adjustable hulling blades for each compartment, the said blades being located between the adjacent faces of the cylinder and clamped between the two parts of the casing, a hulling cylinder for each compartment having ribs for feeding the material from the infeed to the discharges and other means for revolving the cylinder in reverse directions.

3. The combination with the single casing, having two independent hulling compartments and having an upper and a lower section, the upper section being hinged to the lower section, the upper hinged section having an inlet and an outlet for each compartment, the first inlet and second outlet being at one end of the casing and the other outlet and inlet being a covered by-pass from one compartment to the other, means for clamping the two sections together, a pair of independent huller blades held between the two compartments, a ribbed hulling cylinder in each compartment for coöperating with the hulling blades, the ribs of one cylinder being reversely disposed with respect to the other cylinder, and a single driving means for revolving the two cylinders in opposite directions.

4. The combination with a casing, having a pair of parallel but independent hulling compartments, said casing comprising a lower fixed member having a bearing bridge lengthwise between the two compartments, an upper hinged member having a bearing portion for closing down onto the bridge portion of the other casing section, a pair of independently adjustable huller blades mounted between the opposing bearing portions of the casing sections that extend into their respective compartments, and a cylinder mounted in each casing compartment, each having a belt pulley, and having hulling ribs for coöperating with their respective huller blades, the ribs being arranged to feed the material forwardly, the ribs on one cylinder acting to feed the material in a direction reverse to the feed of the other cylinders, the two hulling compartments being joined at one end by a cross over passage, one compartment having an infeed at one end, the other compartment at the corresponding end having an outlet, and a single belt drive that takes around the cylinder pulleys for driving the cylinders in opposite directions.

5. The combination with the lower and the upper sections of the casing, the hulling compartment formed thereby when closed, and the hulling cylinder mounted in the said compartment, the lower casing section having recesses, the upper sections having slots that register with the recesses, the latter and the slots being parallel with the axes of the cylinder, the upper casing having threaded bosses; of a huller blade movably mounted between the upper and lower casing sections, and to project at one edge to the hulling compartment, said blade having a diagonal slot in each end, a yoke for each end of the blade, each yoke having a pendent lug that extends through the slots in the upper casing section and the blade and into the recess in the lower casing section and a screw bolt mounted in each of the threaded bosses, of the upper casing section that carries the blade adjusting yokes.

6. In a machine of the character described, the combination with a pair of coöperating hulling chambers and cylinders; of a pair of independent huller blades, mounted between the two cylinders for coöperating therewith and means mounted on the opposite ends of the upper casing section, connected with the opposite ends of the blades for independently adjusting the said blades, as set forth.

7. In a machine of the character described, the combination with a casing composed of an upper and a lower section, and having a hulling compartment, a rotary ribbed cylinder mounted in the said compartment, of a huller blade held between the upper and lower sections to project one edge to coact with the cylinder ribs, said blade having a diagonally disposed slot in each end, a yoke for each end of the cylinder, a screw adjusting means for each yoke that moves the yoke in a plane parallel with the axis of the cylinder, said yokes each having a pendent lug that extends into the diagonal slots in the huller blade.

8. A means for hulling grains of rice, coffee or the like, comprising a single casing structure having a pair of coöperating hulling chambers and cylinders, the cylinders being relatively arranged to feed the material in opposite directions, the hulling chambers being connected so that one receives the stock as it discharges from the other, a pair of independent hulling blades mounted between the adjacent faces of the two cylinders, and means on the casing connected with the hulling blades for independently adjusting the blades.

9. The combination of the single casing comprising a lower section and an upper section hinged thereto and disposed at an incline, said casing having two parallel compartments an upper and a lower, the upper compartment having an infeed at one end, the lower compartment having a discharge at the corresponding end, the upper and lower casing sections having bearing portions intermediate the compartments; a ribbed cylinder mounted in each compartment, the cylinders each having a drive pulley, said pulleys being adjacently disposed, a single belt drive that takes around the pulleys to revolve the cylinders in reverse directions, the two compartments being connected at that end opposite the infeed, by a covered bypass, and a hulling blade for each cylinder, said blades being held between the upper and lower casing sections at a point between the two compartments, and means mounted on each end of the casing that coöperate with the blades for adjusting the said blades.

FRED G. DIETERICH.

Witnesses:
ELEANOR MACCORMICK,
ANITA C. DIETERICH.